(12) United States Patent
Iino et al.

(10) Patent No.: US 10,773,589 B2
(45) Date of Patent: Sep. 15, 2020

(54) CHECK VALVE FOR FUEL TANK

(71) Applicant: TOYODA GOSEI, CO., LTD., Kiyosu-shi, Aichi-ken (JP)

(72) Inventors: Takuro Iino, Kiyosu (JP); Hiroaki Kito, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/103,408

(22) Filed: Aug. 14, 2018

(65) Prior Publication Data

US 2019/0092162 A1    Mar. 28, 2019

(30) Foreign Application Priority Data

Sep. 26, 2017    (JP) .................................. 2017-184344

(51) Int. Cl.
*B60K 15/04* (2006.01)
*F16K 15/06* (2006.01)
(Continued)

(52) U.S. Cl.
CPC ............ *B60K 15/04* (2013.01); *F16K 15/026* (2013.01); *F16K 15/063* (2013.01);
(Continued)

(58) Field of Classification Search
CPC .......... B60K 15/04; B60K 2015/03276; B60K 2015/03026; B60K 2015/0448;
(Continued)

(56) References Cited

U.S. PATENT DOCUMENTS 1,260,663 A * 3/1918 Gould ................... F16K 15/063
                                                      137/541
4,148,338 A * 4/1979 Skoli ..................... F16K 15/063
                                                      137/454.2
(Continued)

FOREIGN PATENT DOCUMENTS

| DE | 10 2013 100 873 A1 | 8/2014 |
| JP | 2005-098229 A | 4/2005 |
| JP | 2005-153693 A | 6/2005 |
| JP | 2010-125947 A | 6/2010 |

OTHER PUBLICATIONS

Notice of Reasons for Refusal dated Jul. 14, 2020 issued on corresponding JP application No. 2017-184344.

*Primary Examiner* — Jessica Cahill
*Assistant Examiner* — Patrick C Williams
(74) *Attorney, Agent, or Firm* — Posz Law Group, PLC (57) ABSTRACT

A check valve for fuel tank comprises a joint that is fixed to a fuel tank, a passage forming part, and a valve member. The joint is connected to one end of the passage forming part, and an outlet is formed at the other end of the passage forming part. The valve member that opens and closes the outlet. The valve member comprises a valve element, a spring bearing part, a holding part continuous to at least one of the joint and the passage forming part, and a compression coil spring. The joint and the passage forming part are communicated to each other to form a fuel passage. At the end on the joint side of the passage forming part in the fuel passage, there is formed a diameter enlarged portion having an inner diameter gradually increasing from a fuel supply pipe side toward the outlet side.

1 Claim, 8 Drawing Sheets

(51) Int. Cl.
*F16K 15/02* (2006.01)
*B60K 15/03* (2006.01)

(52) U.S. Cl.
CPC ............... *B60K 2015/03026* (2013.01); *B60K 2015/0346* (2013.01); *B60K 2015/03256* (2013.01); *B60K 2015/03276* (2013.01); *B60K 2015/0448* (2013.01); *B60K 2015/0477* (2013.01)

(58) Field of Classification Search
CPC .. B60K 2015/03256; B60K 2015/0477; B60K 2015/0346; B60K 2015/0458; F16K 15/026; F16K 15/063
See application file for complete search history.

(56) References Cited

U.S. PATENT DOCUMENTS

| | | | | |
|---|---|---|---|---|
| 4,799,552 | A * | 1/1989 | Acree | ................... E21B 33/068 |
| | | | | 137/268 |
| 7,082,964 | B1 * | 8/2006 | Yoshizawa | ............ F16K 15/026 |
| | | | | 137/543 |
| 8,042,788 | B2 * | 10/2011 | Kobayashi | ............ F16K 15/063 |
| | | | | 137/592 |
| 8,403,001 | B2 * | 3/2013 | Ishizaka | ................. B60K 15/04 |
| | | | | 137/515 |
| 2005/0067027 | A1 | 3/2005 | Kaneko | |
| 2005/0121105 | A1 | 6/2005 | Kaneko | |
| 2010/0126603 | A1 | 5/2010 | Yamaguchi | |

\* cited by examiner

CHECK VALVE FOR FUEL TANK

CROSS-REFERENCE TO RELATED APPLICATION

This application claims priority from Japanese Patent Application No. 2017-184344, filed on Sep. 26, 2017, the entirety of the content of which is hereby incorporated by reference into this application.

BACKGROUND

Field

The present disclosure relates to a check valve for fuel tank.

Related Art

Conventionally, a check valve may be arranged in a fuel tank of a fuel supply device. The check valve is opened at the time of fuel supply to guide a fuel supplied from a fuel feed pipe to the fuel tank, and is closed during non-fuel supply to suppress a backflow of the fuel from the fuel tank to the fuel feed pipe. A check valve described in Japanese Patent Publication No. JP 2005-153693A includes a connection main body attached to a fuel feed pipe and welded to a fuel tank, and a passage forming member main body positioned in the fuel tank. The valve element is pressed by pressure of a supplied fuel, and thus opened. The valve element is held by a holding part continuous to the passage forming member main body, and is configured to be movable in an axis direction.

In the check valve described in JP 2005-153693A, an inner diameter of the passage forming member main body is configured to be larger than an inner diameter of the connection main body to improve fuel supply performance. Thus, a large level difference due to the difference of an inner diameter between the connection main body and the passage forming member main body has caused a turbulent flow of a fuel, and the turbulent flow has caused a pressure loss at the time of fuel supply. Therefore, there has been demanded, supply for the check valve for fuel tank, a technology of suppressing a pressure loss at the time of fuel.

SUMMARY

According to one aspect of the present disclosure, there is provided a check valve for fuel tank. The check valve for fuel tank comprises a cylindrical joint that is fixed to a fuel tank to surround a tank opening formed on the fuel tank and is connected to a fuel supply pipe; a cylindrical passage forming part that is arranged at least partially in the fuel tank, is connected to the cylindrical joint at one end of the cylindrical passage forming part, and includes an outlet for letting a fuel flow out at the other end of the cylindrical passage forming part, and a valve member that opens and closes the outlet; wherein the valve member includes: a valve element including a sealing part sealing the outlet and an axis part continuous to the sealing part along an axis line of the cylindrical passage forming part, and formed to be movable along the axis line; a spring bearing part arranged at an end of the axis part being an end on an opposite side of the outlet side; a holding part continuous to at least one of the cylindrical joint and the cylindrical passage forming part, and arranged on the outlet side than the spring bearing part to surround and hold at least a part of the axis part; and a compression coil spring fixed to the holding part and the spring bearing part at both ends in an axis direction of the compression coil spring, an inner diameter of the cylindrical joint is smaller than an inner diameter of an end on the outlet side of the cylindrical passage forming part, an inner side of the cylindrical joint and an inner side of the cylindrical passage forming part are communicated to each other to form a fuel passage, and a part corresponding to an end on the cylindrical joint side of the cylindrical passage forming part in the fuel passage comprises a diameter enlarged portion having an inner diameter gradually increasing from the fuel supply pipe side toward the outlet side.

DESCRIPTION OF EMBODIMENTS

A. First Embodiment

Figure 1:
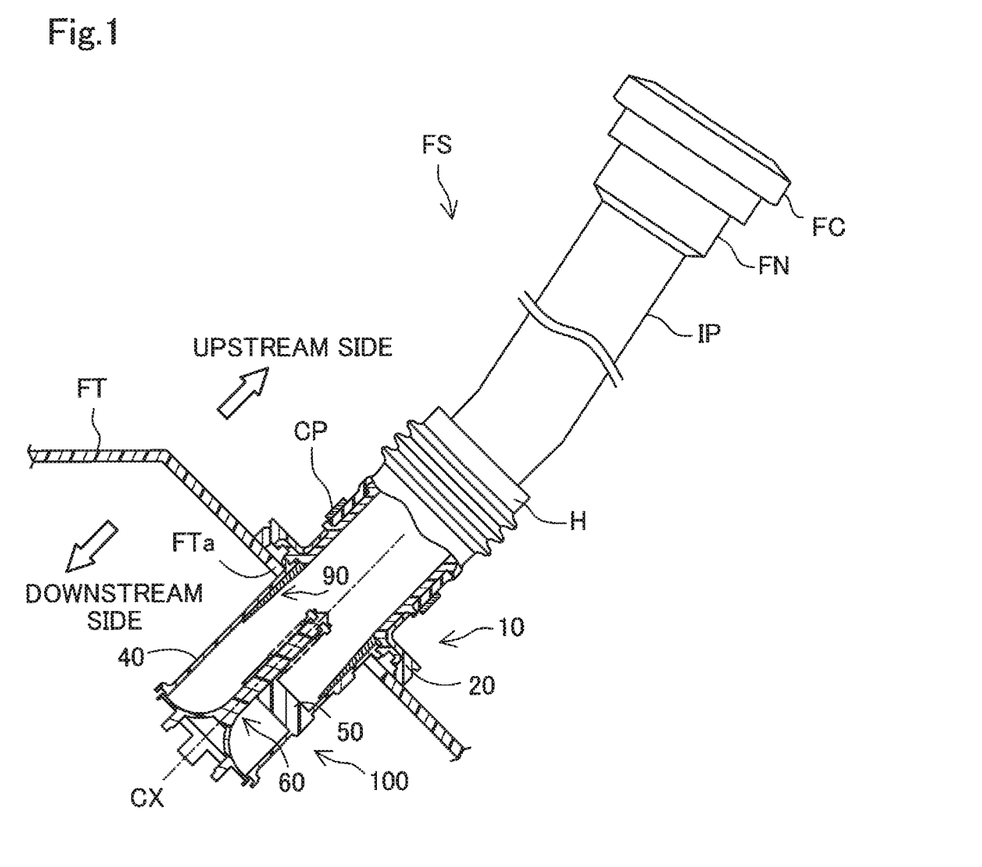
FIG. 1 is a schematic view of a fuel supply device to which a check valve as an embodiment of the present disclosure is applied.

A-1. Entire Configuration of Fuel Supply Device:

FIG. 1 is a schematic view illustrating a schematic configuration of a fuel supply device FS to which a check valve 10 as an embodiment of the present disclosure is applied. The fuel supply device FS is mounted in a vehicle to feed a fuel supplied from a fuel-feed gun (not illustrated) to a filler neck FN to a fuel tank FT. In the following description, the filler neck FN side of the fuel supply device FS is also referred to as an upstream side, and the fuel tank FT side is also referred to as a downstream side. In FIG. 1, a part of the upstream side of the fuel supply device FS is illustrated in an external view, and a part of the downstream side thereof is illustrated in a section view.

The fuel supply device FS is connected to the fuel tank FT storing a fuel. The fuel tank FT includes a barrier layer formed of ethylene-vinyl alcohol copolymer (EVOH) excellent in fuel permeability resistance, and a plurality of resin layers comprising an outer layer formed of polyethylene. The fuel tank FT includes a circular tank opening FTa.

The fuel supply device FS includes the filler neck FN, an inlet pipe IP, an inlet hose H, and the check valve 10.

The filler neck FN includes an inlet opened and closed by a fuel cap FC. The filler neck FN is connected to the fuel tank FT by a breather pipe (not illustrated). The inlet pipe IP is connected to one end of the filler neck FN to let a fuel flow. The inlet hose H connects the inlet pipe IP and the check valve 10. An end on the upstream side of the inlet hose H is connected to an end on the downstream side of the inlet pipe IP. An end on the upstream side of the check valve 10 is pressed in an end on the downstream side of the inlet hose H, and such a pressed-in part is fastened by a clamp CP. In the embodiment, the inlet hose H is formed of a rubber material.

Figure 2:
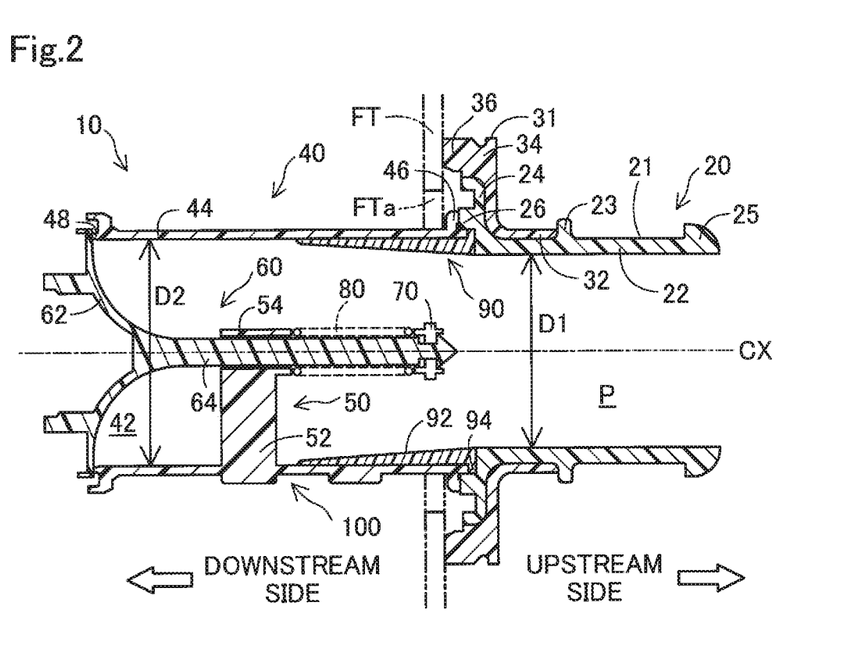
FIG. 2 is a section view illustrating a schematic configuration of the check valve.

A-2. Configuration of Check Valve:

FIG. 2 is a section view illustrating a schematic configuration of the check valve 10. The check valve 10 is opened at the time of fuel supply to guide a supplied fuel to the fuel tank FT, and is closed at the time of non-fuel supply to suppress a backflow of the fuel from the fuel tank FT. Note that FIG. 2 illustrates the closed check valve 10, and illustrates an axis line CX of the check valve 10 by a dashed line.

The check valve 10 includes a joint 20, a passage forming part 40, a valve member 100, and a diameter enlarged member 90.

As illustrated in FIG. 1, the joint 20 is arranged on the outer side of the fuel tank FT to connect the inlet hose H and the fuel tank FT. As illustrated in FIG. 2, the joint 20 has a substantially cylindrical exterior shape with a flange shaped end on the downstream side. The joint 20 includes a first resin layer 21 and a second resin layer 31. The first resin layer 21 and the second resin layer 31 are formed integrally by injection molding of two color molding.

The first resin layer 21 is positioned on the inner side in a radial direction than the second resin layer 31, and includes an inner cylindrical part 22, a flange part 24, a locking part 25, and a joint connection part 26. The inner cylindrical part 22 has a cylindrical exterior shape, and is pressed in the inlet hose H. The inside of the inner cylindrical part 22 forms a fuel passage P. The outer surface of the inner cylindrical part 22 includes a projection 23 projecting toward the outer side in the radial direction. The projection 23 functions for positioning of the inlet hose H when it is pressed in. The flange part 24 is formed from the end on the downstream side of the inner cylindrical part 22 toward the outer side in the radial direction. The locking part 25 suppresses detachment and disconnection of the inlet hose H. The joint connection part 26 is formed on the flange part 24 to project toward the downstream side, and is welded to a passage connection part 46 of the passage forming part 40. In the embodiment, the first resin layer 21 is formed of polyamide. Note that the first resin layer 21 may be formed of other arbitrary resin materials excellent in fuel permeability resistance such as polyacetal, instead of polyamide.

The second resin layer 31 is positioned on the outer side in the radial direction than the first resin layer 21, and includes an outer cylindrical part 32, an annular part 34, and a tank welding part 36. The outer cylindrical part 32 has a shorter cylindrical exterior shape than the inner cylindrical part 22, and is arranged to be in contact with the outer surface of the end on the downstream side of the inner cylindrical part 22. The annular part 34 is formed from the end on the downstream side of the outer cylindrical part 32 toward the outer side in the radial direction. The tank welding part 36 is formed from the outer end in the radial direction of the annular part 34 toward the downstream side. The tank welding part 36 is welded and fixed to the fuel tank FT to surround the tank opening FTa of the fuel tank FT. In the embodiment, the second resin layer 31 is formed of modified polyethylene. The modified polyethylene is a resin member in which a polar functional group, e.g., a maleic acid-modified functional group is added to polyethylene, and is reactively adhered to polyamide by heat at the time of injection molding.

An inner diameter D1 of the joint 20 (inner cylindrical part 22) is formed to have a size allowing the inner cylindrical part 22 to be pressed in the inlet hose H. That is, the inner diameter D1 of the joint 20 is formed depending on the inner diameter of the inlet hose H. The inner diameter D1 of the joint 20 is smaller than an inner diameter D2 of the end on an outlet 42 side of the passage forming part 40 described later.

The passage forming part 40 has a substantially cylindrical exterior shape, and is connected to the end on the downstream side of the joint 20. The end on the downstream side of the passage forming part 40 is formed as the outlet 42 for letting a supplied fuel flow out to the fuel tank FT. The passage forming part 40 includes a cylindrical part 44, a passage connection part 46, and a valve seat 48.

The cylindrical part 44 has a cylindrical external shape. The inside of the cylindrical part 44 forms the fuel passage P. The passage connection part 46 is arranged at the end on the upstream side of the cylindrical part 44 to project from the outer surface of the cylindrical part 44 toward the outer side in the radial direction. The passage connection part 46 is positioned on the outer side of the fuel tank FT and is welded to the joint connection part 26. In the passage forming part 40, the parts other than the end of the passage connection part 46 side are arranged in the fuel tank FT. The valve seat 48 is formed to surround the outlet 42 and project to the downstream side. A valve element 60 is seated on the valve seat 48.

The inner diameter D2 of the end on the outlet 42 side of the passage forming part 40 (cylindrical part 44) is formed to be larger than the inner diameter D1 of the joint 20 to secure a flow amount of the fuel flowing in the fuel passage P and the outlet 42. Moreover, in the embodiment, the passage forming part 40 is formed of polyamide, similarly to the first resin layer 21. Note that the passage forming part 40 may be formed of arbitrary resin materials same as of the first resin layer 21, such as polyacetal instead of polyamide. Moreover, the passage forming part 40 is formed by injection molding. Thus, the cylindrical part 44, the passage connection part 46, the valve seat 48, and a holding part 50 described later are formed integrally.

The valve member 100 opens and closes the outlet 42. The valve member 100 includes the valve element 60, the holding part 50, a spring bearing part 70, and a compression coil spring 80.

The valve element 60 has a horn external shape, and is configured to be movable along the axis line CX. The valve element 60 includes a sealing part 62 and an axis part 64. The sealing part 62 has a substantially conical external shape, and is arranged so that the end on the downstream side faces the valve seat 48 to be able to seal the outlet 42. At a portion facing the valve seat 48 in the sealing part 62, there is arranged rubber (not illustrated). Thus, the sealing part 62 and the valve seat 48 are adhered to each other. The axis part 64 has a bar exterior shape along the axis line CX, and is formed to be continuous to the upstream side of the sealing part 62. The axis part 64 is inserted and held in the cylindrical part 54 of the holding part 50. In the embodiment, the valve element 60 is formed of polyacetal. However, the valve element 60 may be formed of other arbitrary resin materials excellent in fuel permeability resistance, such as polyamide.

The holding part 50 is integrally formed to be continuous to the cylindrical part 44 of the passage forming part 40, and surrounds and holds a part of the axis part 64 of the valve element 60. The holding part 50 projects from the inner side surface of the cylindrical part 44 toward the axis part 64 to hold a part of the axis part 64. The holding part 50 include three plate parts 52 and the cylindrical part 54. The three plate parts 52 are continuous to the inner side surface of the cylindrical part 44, and are arranged with same intervals with a mutual angle of 120° in the circumferential direction. FIG. 2 illustrates a section passing one of three plate parts 52. The number of plate parts 52 is not limited to three, and may be another arbitrary number such as 2 or 4. The cylindrical part 54 has a cylindrical exterior shape, and is formed to be continuous to the inner end in the radial direction of each plate part 52. The axis part 64 of the valve element 60 is inserted in the cylindrical part 54.

The spring bearing part 70 has a substantially annular exterior shape, and is welded to the end on the upstream side (opposite side of the outlet 42 side) of the axis part 64 of the valve element 60. Thus, the spring bearing part 70 is arranged on the upstream side than the spring bearing part 50. One end of the compression coil spring 80 is fixed to an end surface on the downstream side of the spring bearing part 70. In the embodiment, the spring bearing part 70 is formed of polyamide. Note that the spring bearing part 70 may be formed of other arbitrary resin materials excellent in fuel permeability resistance such as polyacetal, instead of polyamide.

The compression coil spring 80 has a substantially cylindrical exterior shape, and stretches along the axis line CX. Both ends in the axis direction of the compression coil spring 80 are fixed to the end surface on the upstream side of the cylindrical part 54 of the holding part 50 and the end surface on the downstream side of the spring bearing part 70. The compression coil spring 80 is contracted and assembled in a given length.

Figure 3:
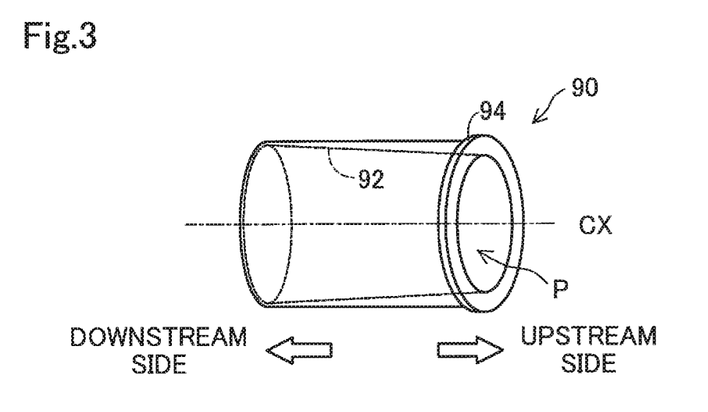
FIG. 3 is a perspective view illustrating a schematic configuration of a diameter enlarged member.

FIG. 3 is a perspective view illustrating a schematic configuration of the diameter enlarged member 90. The diameter enlarged member 90 has a substantially cylindrical external shape. The inside of the diameter enlarged member 90 forms the fuel passage P. As illustrated in FIG. 2, the diameter enlarged member 90 is arranged along the inner surface on the joint 20 side of the cylindrical part 44 of the passage forming part 40. Thus, the inside of the joint 20, the inside of the diameter enlarged member 90, and the inside of the passage forming part 40 are communicated to each other to form the fuel passage P. At a portion corresponding to the end on the joint 20 side of the passage forming part 40 in the fuel passage P, there is formed a diameter enlarged portion 92 having an inner diameter gradually increasing from the upstream side (inlet hose H and inlet pipe IP side) toward the downstream side (outlet 42 side). In the embodiment, the diameter enlarged member 90 forms the diameter enlarged portion 92.

The inner diameter of the diameter enlarged member 90 (diameter enlarged portion 92) increases gradually from the upstream side toward the downstream side. It is equal to the inner diameter D1 of the joint 20 (inner cylindrical part 22) at the end on the upstream side, and is almost equal to the inner diameter D2 of the end on the outlet 42 side of the passage forming part 40 (cylindrical part 44) at the end on the downstream side. In the embodiment, the inner side surface (diameter enlarged portion 92) of the diameter enlarged member 90 is formed to be inclined relative to the axis line CX to have a certain gradient in the axis direction, and the inner diameter increases monotonously toward the downstream side. Thus, the diameter enlarged member 90 is formed to be thicker toward the upstream side, and thinner toward the downstream side. The end on the downstream side of the diameter enlarged member 90 is formed to be thin to be smoothly connected to the inner side surface of the cylindrical part 44. In the embodiment, at the end on the upstream side of the diameter enlarged member 90, there is formed a claw 94 projecting to the outer side in the radial direction. The claw 94 is arranged between the first resin layer 21 and the cylindrical part 44 to suppress deviation of the position in the axis direction of the diameter enlarged member 90.

In the embodiment, the diameter enlarged member 90 is formed of polyamide. Note that the diameter enlarged member 90 may be formed of other arbitrary resin materials excellent in fuel permeability resistance such as polyacetal, instead of polyamide.

In the embodiment, the check valve 10 corresponds to a lower concept of the check valve for fuel tank in "SUMMARY", and the inlet hose H and the inlet pipe IP correspond to a lower concept of the fuel supply pipe in "SUMMARY."

A-3. Check Valve Manufacturing Method and Method of Assembling to Fuel Tank:

The manufacturing of the check valve 10 and the assembly to the fuel tank FT may be performed in the following manner, for example. First, the members of the check valve 10 other than the compression coil spring 80 are prepared in the step by injection molding. Next, the axis part 64 of the valve element 60 is inserted into the cylindrical part 54 of the holding part 50, and the spring bearing part 70 is welded to the axis part 64 so that the compression coil spring 80 is interposed therebetween. Next, the diameter enlarged member 90 is arranged along the inner side surface of the cylindrical part 44 of the passage forming part 40, and the passage connection part 46 of the passage forming part 40 is welded to the joint connection part 26 of the joint 20 to complete the check valve 10. Next, the tank welding part 36 of the joint 20 and the periphery of the tank opening FTa of the fuel tank FT are melted by a heating plate or the like, and the tank welding part 36 is pressed against the periphery of the tank opening FTa. The outer layer of the fuel tank FT is formed of polyethylene, and thus it is heat-welded to the tank welding part 36 formed of modified polyethylene. In such a manner, the check valve 10 is assembled to the fuel tank FT.

A-4. Action of Check Valve:

In the fuel supply device FS illustrated in FIG. 1, when the fuel cap FC is removed at the time of fuel supply, and a fuel is injected from a fuel-feed gun (not illustrated) to the filler neck FN, the fuel flows in the inlet pipe IP and the inlet hose H, and passes the check valve 10 to be supplied into the fuel tank FT.

The fuel flowing into the joint 20 illustrated in FIG. 2 flows in the fuel passage P. The inside of the diameter enlarged member 90 forms a part of the fuel passage P, and thus the fuel flows in the diameter enlarged member 90. The inner diameter of the diameter enlarged portion 92 is equal to the inner diameter of the joint 20 at the end on the upstream side, and gradually increases toward the downstream side. This suppresses occurrence of a level difference at the connection portion between the joint 20 and the passage forming part 40 due to the difference of inner diameter between the joint 20 and the passage forming part 40. The diameter enlarged portion 92 gradually enlarges the fuel passage P from the upstream side toward the downstream side, smoothly guiding the fuel to the outlet side 42.

The fuel flowing to the outlet 42 side presses the sealing part 62 of the valve element 60 toward the downstream side. This compresses the compression coil spring 80, so that the sealing part 62 is separated from the valve seat 48 and the check valve 10 is opened. When the check valve 10 is opened, the fuel is supplied to the fuel tank FT.

Once the fuel supply is completed, the energizing force of the compression coil spring 80 restores the valve element 60 to the upstream side, and the sealing part 62 is seated on the valve seat 48 to seal the outlet 42 and close the check valve 10. The closing of the check valve 10 suppresses a backflow of the fuel. That is, it suppresses the increase of inner pressure of the fuel tank FT due to fuel supply that causes push-back of the fuel from the fuel tank FT to the check valve 10 side.

In the check valve 10 of the first embodiment described above, the diameter enlarged member 90 forming the diameter enlarged portion 92 having the inner diameter gradually increasing from the upstream side toward the downstream side is arranged on the inner side of the end on the upstream side of the passage forming part 40. This suppresses occurrence of a large level difference at the connection portion between the joint 20 and the passage forming part 40 due to the difference of inner diameter between the joint 20 and the passage forming part 40, and thus suppresses occurrence of a turbulent flow of the fuel at such a level difference. Therefore, it is possible to suppress a pressure loss at the time of fuel supply and suppress deterioration of fuel supply performance.

Moreover, the inner diameter of the end on the upstream side of the diameter enlarged portion 92 is equal to the inner diameter of the joint 20. Thus, it is possible to suppress occurrence of a level difference in the fuel passage P at a contact portion between the diameter enlarged member 90 and the joint 20 and further suppress a pressure loss at the time of fuel supply. Moreover, the diameter enlarged portion 92 is formed to have a certain gradient in the axis direction, and thus the inner diameter of the diameter enlarged portion 92 increases monotonously toward the downstream side. This suppresses occurrence of a turbulent flow of the fuel at the diameter enlarged portion 92 and further suppresses a pressure loss at the time of fuel supply. Furthermore, the end on the downstream side of the diameter enlarged member 90 is formed to be thin, which smoothly connects the end on the downstream side of the diameter enlarged portion 92 and the inner side surface of the cylindrical part 44. Therefore, it is possible to suppress occurrence of a large level difference in the fuel passage P at a contact portion between the end on the downstream side of the diameter enlarged portion 92 and the cylindrical part 44 and further suppress a pressure loss at the time of fuel supply.

Moreover, even when the inner diameter of the cylindrical part 44 of the passage forming part 40 is formed to be larger than the inner diameter D1 of the joint 20, the diameter enlarged portion 92 is able to suppress occurrence of a large level difference at a connection portion between the joint 20 and the passage forming part 40. This makes it possible to make the inner diameter of the cylindrical part 44 and the outlet 42 large, suppressing deterioration of fuel supply performance.

In addition, the diameter enlarged member 90 forming the diameter enlarged portion 92 is formed separately from the joint 20 and the passage forming part 40, which achieves the diameter enlarged portion 92 by an easy method. That is, as compared with the configuration in which the diameter enlarged portion 92 and the holding part 50 are formed integrally with the passage forming part 40, it is possible to suppress an undercut of the diameter enlarged portion 92 or the holding part 50 at the time of injection molding that disables mold release of the passage forming part 40. Therefore, it is possible to easily form the passage forming part 40 by injection molding, suppressing deterioration of productivity. Moreover, the diameter enlarged member 90 forming the diameter enlarged portion 92 is formed separately from the joint 20 and the passage forming part 40, which makes the dedicated passage forming part 40 and joint 20 for the diameter enlarged portion 92 unnecessary, suppressing the increase of manufacturing costs of the check valve 10.

Furthermore, at the end on the upstream side of the diameter enlarged member 90, there is formed the claw 94 arranged between the first resin layer 21 and the cylindrical part 44. This suppresses deviation of the position in the axis direction of the diameter enlarged member 90 due to a size change of members by swelling of the fuel, as compared with the configuration in which the claw 94 is omitted.

In addition, the holding part 50 is formed to be continuous to the cylindrical part 44, which shortens the length of the axis part 64 of the valve element 60, as compared with the configuration in which the holding part 50 is formed on the upstream side. Therefore, it is possible to suppress deterioration of linearity of the axis part 64, and suppress deterioration of sealing property between the sealing part 62 and the valve seat 48 due to deviation of the axis line CX of the axis part 64 from the axis line CX of the check valve 10.

B. Second Embodiment

Figure 4:
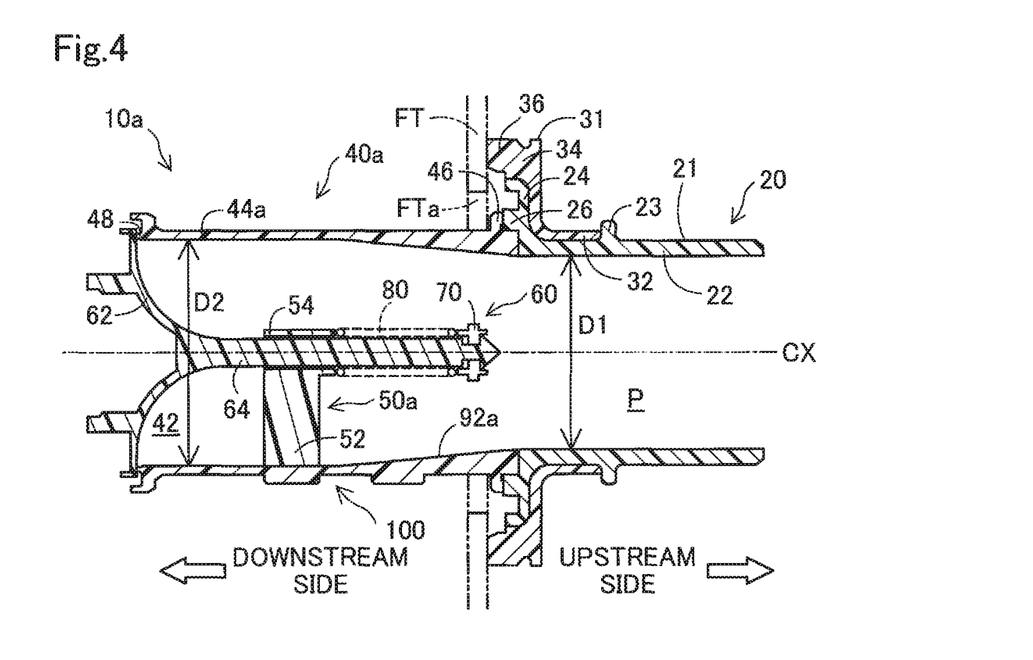
FIG. 4 is a section view illustrating a schematic configuration of a check valve according to a second embodiment.

FIG. 4 is a section view illustrating a schematic configuration of a check valve 10a according to the second embodiment. The check valve 10a of the second embodiment is different from the check valve 10 of the first embodiment in the aspects that a passage forming part 40a is provided instead of the passage forming part 40, that the diameter enlarged member 90 is omitted and a diameter enlarged portion 92a is formed by the passage forming part 40a, and that the locking part 25 is omitted and a connector (not illustrated) and the projection 23 are fastened. The other configurations are same as of the check valve 10 of the first embodiment. Thus, the same components are represented with the same symbols, and the detailed description thereof is omitted.

In the passage forming part 40a of the second embodiment, the inner diameter of the end on the joint 20 side increases gradually from the upstream side toward the downstream side, as compared with the passage forming part 40 of the first embodiment. Thus, the end on the joint 20 side of the passage forming part 40a forms the diameter enlarged portion 92a of the fuel passage P. Moreover, in the passage forming part 40a of the second embodiment, the holding part 50a is formed separately and welded to the inner side surface of the cylindrical part 44a, as compared with the passage forming part 40 of the first embodiment. Such welding may be performed by laser welding, for example. The projection 23 of the second embodiment functions as a bulge portion for so-called quick connector. Thus, the check valve 10a is connected to the inlet hose H through the connector.

The check valve 10a of the second embodiment exerts the same effects as the check valve 10 of the first embodiment. In addition, the holding part 50a is formed separately from the passage forming part 40a. Thus, as compared with the configuration in which the diameter enlarged portion 92a and the holding part 50a are formed integrally with the passage forming part 40a, it is possible to suppress an undercut of the diameter enlarged portion 92a or the holding part 50a at the time of injection molding that disables mold release of the passage forming part 40a.

C. Third Embodiment

Figure 5:
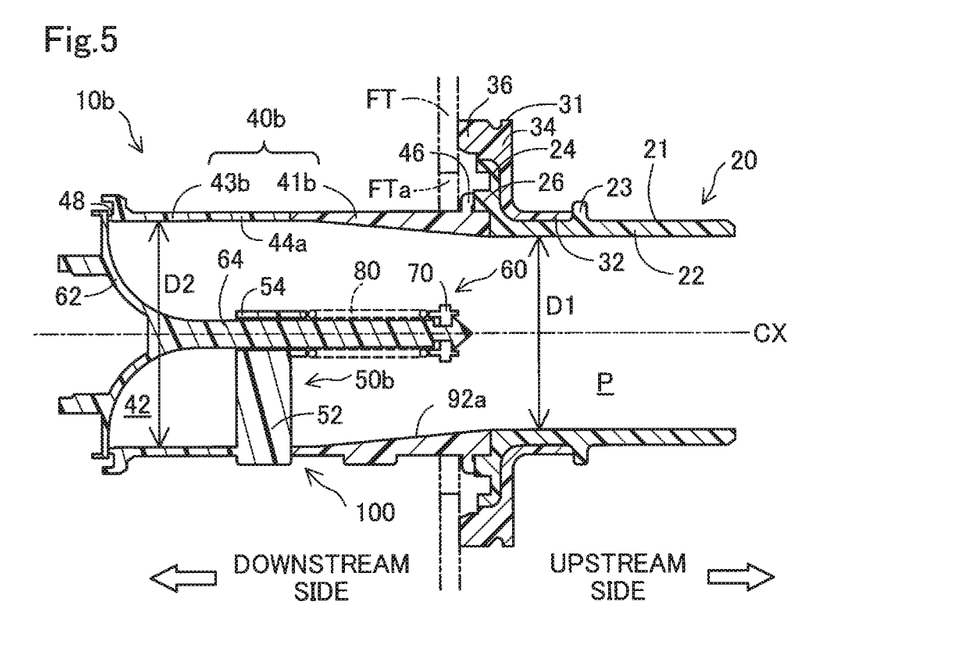
FIG. 5 is a section view illustrating a schematic configuration of a check valve according to a third embodiment.

FIG. 5 is a section view illustrating a schematic configuration of a check valve 10b according to the third embodiment. The check valve 10b of the third embodiment is different from the check valve 10a of the second embodiment in the aspect that a passage forming part 40b is provided instead of the passage forming part 40a. The other configurations are same as of the check valve 10a of the second embodiment. Thus, the same components are represented with the same symbols, and the detailed description thereof is omitted.

The passage forming part 40b of the third embodiment includes a first member 41b on the upstream side and a second member 43b positioned on the downstream side (outlet 42 side) than the first member 41b. Such two members 41b, 43b are formed separately by injection molding and welded to each other. The first member 41b includes the diameter enlarged portion 92a. A holding part 50b is formed integrally to the second member 43b.

The check valve 10b of the third embodiment exerts the same effects as the check valve 10a of the second embodiment. In addition, the passage forming part 40b is formed dividedly to the first member 41b and the second member 43b. Thus, as compared with the configuration in which the first member 41b and the second member 43b are formed integrally, it is possible to suppress an undercut of the diameter enlarged portion 92a or the holding part 50b at the time of injection molding that disables mold release of the passage forming part 40b.

D. Fourth Embodiment

Figure 6:
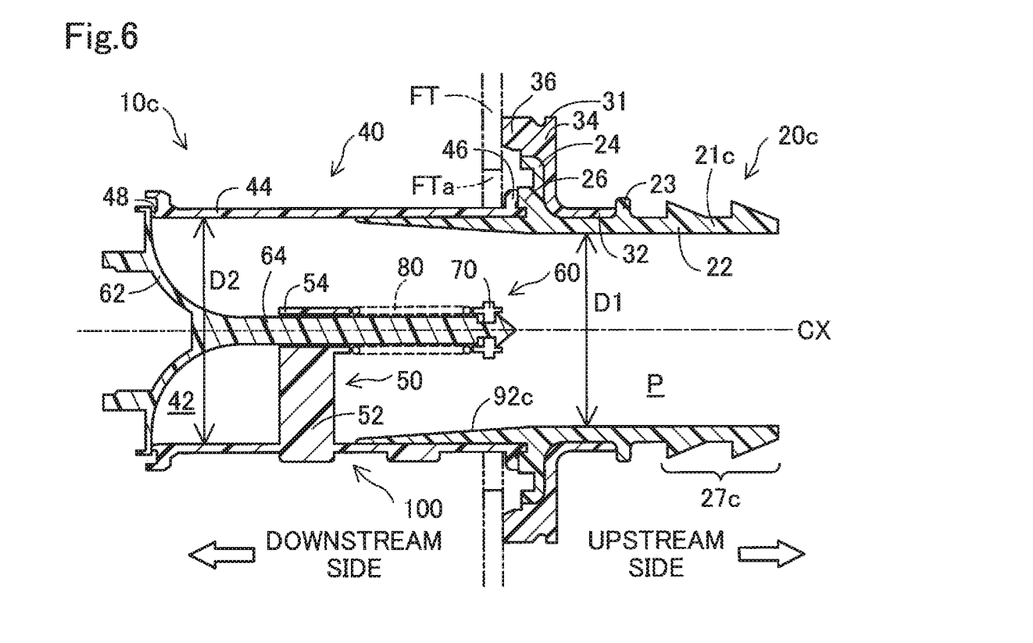
FIG. 6 is a section view illustrating a schematic configuration of a check valve according to a fourth embodiment.

FIG. 6 is a section view illustrating a schematic configuration of a check valve 10c according to the fourth embodiment. The check valve 10c of the fourth embodiment is different from the check valve 10 of the first embodiment in the aspects that a joint 20c is provided instead of the joint 20, that the diameter enlarged member 90 is omitted and a diameter enlarged portion 92c is formed in the joint 20c, and that the inlet hose H and a firtree portion 27c are fastened. The other configurations are same as of the check valve 10 of the first embodiment. Thus, the same components are represented with the same symbols, and the detailed description thereof is omitted.

In the joint 20c of the fourth embodiment, the end on the passage forming part 40 is inserted in the inner side of the passage forming part 40, as compared with the joint 20 of the first embodiment. Moreover, the inner diameter of the end on the passage forming part 40 side of the joint 20c increases gradually from the upstream side toward the downstream side. Therefore, the end on the passage forming part 40 side of the joint 20c forms the diameter enlarged portion 92c of the fuel passage P. Note that the end on the passage forming part 40 side of the joint 20c is formed integrally with the first resin layer 21c. Moreover, the joint 20c includes the firtree portion 27c at the end on the upstream side. The firtree portion 27c is formed by a plurality of projections projecting toward the outer side in the radial direction, suppressing detachment and disconnection of the inlet hose H.

The check valve 10c of the fourth embodiment exerts the same effects as the check valve 10 of the first embodiment. In addition, the diameter enlarged portion 92c is formed by the joint 20c. Thus, as compared with the configuration in which the diameter enlarged portion 92c and the holding part 50 are formed integrally with the passage forming part 40, it is possible to suppress an undercut of the diameter enlarged portion 92c or the holding part 50 at the time of injection molding that disables mold release of the passage forming part 40. Moreover, the undercut of the diameter enlarged portion 92c is avoided in the joint 20c, allowing easy formation of the joint 20c by injection molding. Furthermore, the diameter enlarged portion 92c is formed by the joint 20c. This suppresses the increase of the number of parts, the increase of manufacturing steps, and thus the increase of manufacturing costs of the check valve 10c. Moreover, it is unnecessary to use the dedicated passage forming part 40, suppressing the increase of manufacturing costs of the check valve 10c.

E. Fifth Embodiment

Figure 7:
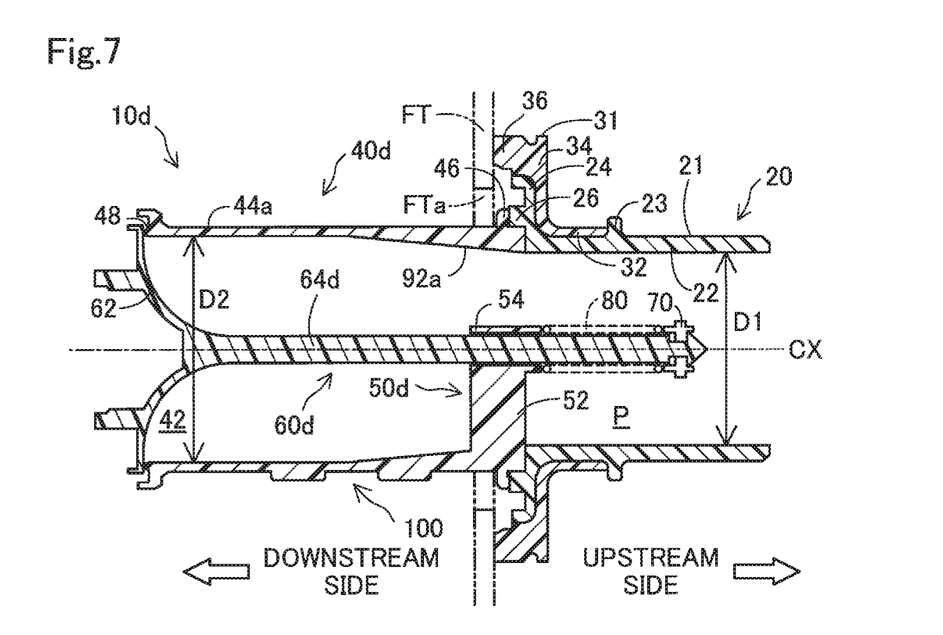
FIG. 7 is a section view illustrating a schematic configuration of a check valve according to a fifth embodiment.

FIG. 7 is a section view illustrating a schematic configuration of a check valve 10d according to the fifth embodiment. The check valve 10d of the fifth embodiment is different from the check valve 10a of the second embodiment in the aspects that a passage forming part 40d is provided instead of the passage forming part 40a and that a valve element 60d is provided instead of the valve element 60. The other configurations are same as of the check valve 10a of the second embodiment. Thus, the same components are represented with the same symbols, and the detailed description thereof is omitted.

In the passage forming part 40d of the fifth embodiment, the holding part 50d is formed integrally at the end on the upstream side of the passage forming part 40d, as compared with the passage forming part 40a of the second embodiment. The valve element 60d of the fifth embodiment has the longer axis part 64d than the valve element 60 of the second embodiment.

The check valve 10d of the fifth embodiment exerts the same effects as the check valve 10a of the second embodiment. In addition, the holding part 50d is formed at the end on the upstream side of the passage forming part 40d. Thus, it is possible to suppress an undercut of the diameter enlarged portion 92a or the holding part 50d at the time of injection molding that disables mold release of the passage forming part 40d. Thus, it is possible to easily form the passage forming part 40d comprising the diameter enlarged portion 92a and the holding part 50d by injection molding. Moreover, the diameter enlarged portion 92a is formed by the passage forming part 40d with which the holding part 50d is formed integrally. This suppresses the increase of the number of parts, the increase of manufacturing steps, and thus the increase of manufacturing costs of the check valve 10d. Moreover, it is unnecessary to use the dedicated joint 20, suppressing the increase of manufacturing costs of the check valve 10d.

F. Sixth Embodiment

Figure 8:
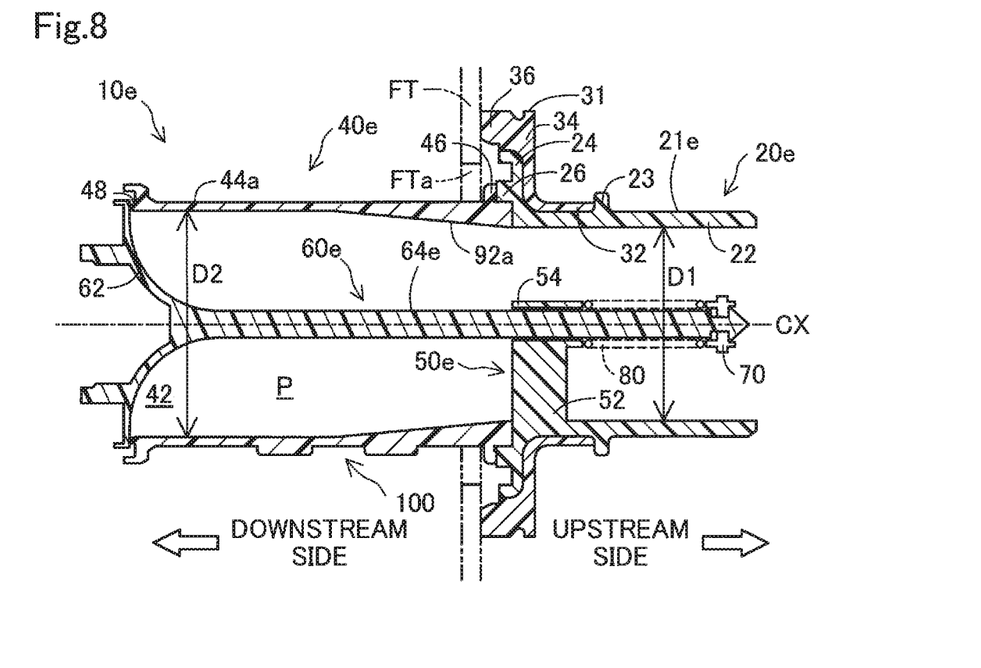
FIG. 8 is a section view illustrating a schematic configuration of a check valve according to a sixth embodiment.

FIG. 8 is a section view illustrating a schematic configuration of a check valve 10e according to the sixth embodiment. The check valve 10e of the sixth embodiment is different from the check valve 10a of the second embodiment in the aspects that a joint 20e is provided instead of the joint 20, that a passage forming part 40e is provided instead of the passage forming part 40a, and that a valve element 60e is provided instead of the valve element 60. The other configurations are same as of the check valve 10a of the second embodiment. Thus, the same components are represented with the same symbols, and the detailed description thereof is omitted.

In the joint 20e of the sixth embodiment, as compared with the joint 20 of the second embodiment, a holding part 50e is formed integrally with a first resin layer 21e at the end on the downstream side of the joint 20e. Note that the holding part 50e may be formed separately, similarly to the holding part 50a of the second embodiment, and welded to the inner side surface of the first resin layer 21e. In the passage forming part 40e of the sixth embodiment, the holding part 50a is omitted as compared with the passage forming part 40a of the second embodiment. The valve element 60e of the sixth embodiment has a longer axis part 64e than the valve element 60 of the second embodiment.

The check valve 10e of the sixth embodiment exerts the same effects as the check valve 10a of the second embodiment. In addition, the holding part 50e is formed integrally with the joint 20e. This suppresses the increase of the number of parts, the increase of manufacturing steps, and thus the increase of manufacturing costs of the check valve 10e. Furthermore, the undercut of the holding part 50e is avoided in the joint 20e, allowing easy formation of the joint 20e by injection molding.

G. Other Embodiments

G-1. Another Embodiment 1

The inner diameter of the diameter enlarged portion 92, 92a, 92c of the above-described embodiments increases monotonously toward the downstream side to have a certain gradient in the axis direction. However, the disclosure is not limited thereto. For example, the diameter enlarged portions 92, 92a, 92c may be formed by combination of a plurality of different gradients. That is, the diameter enlarged portions 92, 92a, 92c may generally have an arbitrary configuration in which the inner diameter gradually increases from the inlet hose H and inlet pipe IP side toward the outlet 42 side. Such configurations also exert the same effects as the check valves 10, 10a to 10e of the embodiments.

G-2. Another Embodiment 2

The inner diameter on the upstream side of the diameter enlarged portion 92, 92a, 92c of the above-described embodiments is equal to the inner diameter D1 of the joint 20, 20c, 20e. However, it may be formed to be slightly larger or smaller than the inner diameter D1 of the joint 20, 20c, 20e in a range allowing desired effects. Such configurations also exert the same effects as the check valves 10, 10a to 10e of the embodiments.

G-3. Another Embodiment 3

In the diameter enlarged member 90 of the first embodiment, the claw 94 is formed at the end on the upstream side. However, the claw 94 may be omitted. In such a form, the end on the downstream side of the diameter enlarged member 90 may be in contact with the plate part 52 to suppress deviation of the position of the diameter enlarged member 90, for example. Alternatively, tapering for molding release of the cylindrical part 44 may be used to suppress deviation of the position of the diameter enlarged member 90, for example. Moreover, the diameter enlarged member 90 and the passage forming part 40 or and the joint 20 may be fixed by welding, for example. Such configurations also exert the same effects as the check valve 10 of the first embodiment.

G-4. Another Embodiment 4

The configurations of the check valves 10a to 10e of the second to the sixth embodiments are only examples, and may be changed variously. For example, the diameter enlarged portion 92a, 90c may be divided to two in the axis direction so that the downstream side thereof is formed integrally with the passage forming part 40a, 40b, 40d, 40e and the upstream side thereof is formed with the joint 20, 20c, 20e. That is, at a portion corresponding to the end on the joint 20, 20c, 20e side of the passage forming part 40a, 40b, 40d, 40e in the fuel passage P, there may be generally formed the diameter enlarged portion 92a, 92c having an inner diameter gradually increasing from the inlet hose H and inlet pipe IP side toward the outlet 42 side. Moreover, the joint 20c of the fourth embodiment may further include the holding part 50 to be formed integrally, for example. That is, the holding part 50, 50a, 50b, 50d, 50e may generally have arbitrary configurations in which it is continuous to at least one of the joint 20, 20c, 20e and the passage forming part 40a, 40b, 40d, 40e, and arranged on the outlet 42 side than the spring bearing part 70 to surround and hold at least a part of the axis part 64, 64d, 64e. Such configurations also exert the same effects as the check valves 10a to 10e of the above-mentioned embodiments. Moreover, as the connection method of the check valve 10, 10a to 10e and the inlet hose H, there may be adopted an arbitrary method such as clamp type, quick connector type, or firtree press-in type of the above-described embodiments.

The present disclosure is not limited to the above-described embodiments, and may be achieved by various configurations without departing from the scope of the disclosure. For example, the technical features in the embodiments may be appropriately replaced or combined in order to solve a part or all of the above-described problem or achieve a part or all of the above-described effects. Moreover, when the technical features are not explained as necessary in the specification, they may be deleted appropriately. For example, the present disclosure may be implemented by any of the aspects described below.

According to one aspect of the present disclosure, there is provided a check valve for fuel tank. The check valve for fuel tank comprises a cylindrical joint that is fixed to a fuel tank to surround a tank opening formed on the fuel tank and is connected to a fuel supply pipe; a cylindrical passage forming part that is arranged at least partially in the fuel tank, is connected to the cylindrical joint at one end of the cylindrical passage forming part, and includes an outlet for letting a fuel flow out at the other end of the cylindrical passage forming part, and a valve member that opens and closes the outlet; wherein the valve member includes: a valve element including a sealing part sealing the outlet and an axis part continuous to the sealing part along an axis line of the cylindrical passage forming part, and formed to be movable along the axis line; a spring bearing part arranged at an end of the axis part being an end on an opposite side of the outlet side; a holding part continuous to at least one of the cylindrical joint and the cylindrical passage forming part, and arranged on the outlet side than the spring bearing part to surround and hold at least a part of the axis part; and a compression coil spring fixed to the holding part and the spring bearing part at both ends in an axis direction of the compression coil spring, an inner diameter of the cylindrical joint is smaller than an inner diameter of an end on the outlet side of the cylindrical passage forming part, an inner side of the cylindrical joint and an inner side of the cylindrical passage forming part are communicated to each other to form a fuel passage, and a part corresponding to an end on the cylindrical joint side of the cylindrical passage forming part in the fuel passage comprises a diameter enlarged portion having an inner diameter gradually increasing from the fuel supply pipe side toward the outlet side. In the check valve for fuel tank of this aspect, at a portion corresponding to the end on the cylindrical joint side of the cylindrical passage forming part in the fuel passage, there is formed the diameter enlarged portion having an inner diameter gradually increasing from the fuel supply pipe side toward the outlet side. This suppresses occurrence of a large level difference at the connection portion between the cylindrical joint and the cylindrical passage forming part due to the difference of inner diameter between the cylindrical joint and the cylindrical passage forming part. Therefore, it is possible to suppress occurrence of a turbulent flow of the fuel at such a level difference and suppress a pressure loss at the time of fuel supply.

The check valve for fuel tank in accordance with the above-described aspect may further include a cylindrical diameter enlarged member that is formed separately from the cylindrical joint and the cylindrical passage forming part, and is arranged along an inner side surface of the cylindrical passage forming part; in which an inner diameter of the diameter enlarged member may gradually increase from the fuel supply pipe side toward the outlet side; and the diameter enlarged member may form the diameter enlarged portion. In the check valve for fuel tank of this aspect, the cylindrical diameter enlarged member formed separately from the cylindrical joint and the passage forming member forms the diameter enlarged portion, which achieves the diameter enlarged portion by an easy method. In addition, as compared with the configuration in which the diameter enlarged portion and the holding part are formed integrally with the cylindrical passage forming part, it is possible to suppress an undercut of the diameter enlarged portion or the holding part at the time of injection molding that disables mold release of the cylindrical passage forming part.

In the check valve for fuel tank in accordance with the above-described aspect, an inner diameter of an end on the cylindrical passage forming part side of the cylindrical joint may gradually increase from the fuel supply pipe side toward the outlet side; and the end on the cylindrical passage forming part side of the cylindrical joint may be inserted in the cylindrical passage forming part to form the diameter enlarged portion. In the check valve for fuel tank of this aspect, the end on the cylindrical passage forming part side of the cylindrical joint forms the diameter enlarged portion, which suppresses the number of parts. In addition, as compared with the configuration in which the diameter enlarged portion and the holding part are formed integrally with the cylindrical passage forming part, it is possible to suppress an undercut of the diameter enlarged portion or the holding part at the time of injection molding that disables mold release of the cylindrical passage forming part.

In the check valve for fuel tank in accordance with the above-described aspect, an inner diameter of the end on the cylindrical joint side of the cylindrical passage forming part may gradually increase from the fuel supply pipe side toward the outlet side, and the end on the cylindrical joint side of the cylindrical passage forming part may form the diameter enlarged portion. In the check valve for fuel tank of this aspect, the end on the cylindrical joint side of the cylindrical passage forming part forms the diameter enlarged portion, which suppresses the number of parts.

In the check valve for fuel tank in accordance with the above-described aspect, the holding part may be formed integrally with the cylindrical passage forming part at the end on the cylindrical joint side of the cylindrical passage forming part. In the check valve for fuel tank of this aspect, the holding part is formed integrally with the cylindrical passage forming part at the end on the cylindrical joint side of the cylindrical passage forming part. Thus, it is possible to suppress an undercut of the diameter enlarged portion or the holding part at the time of injection molding that disables mold release of the cylindrical passage forming part.

In the check valve for fuel tank in accordance with the above-described aspect, the cylindrical passage forming part may include a first member with the diameter enlarged portion and a second member positioned on the outlet side than the first member; and the holding part may be formed integrally with the second member. In the check valve for fuel tank of this aspect, the cylindrical passage forming part includes the first member with the diameter enlarged portion and the second member with which the holding part is formed integrally. Thus, it is possible to suppress an undercut of the diameter enlarged portion or the holding part at the time of injection molding that disables mold release of the cylindrical passage forming part.

In the check valve for fuel tank in accordance with the above-described aspect, the holding part may be formed integrally with the cylindrical joint. In the check valve for fuel tank of this aspect, the holding part is formed integrally with the cylindrical joint, which suppresses the number of parts. In addition, as compared with the configuration in which the diameter enlarged portion and the holding part are formed integrally with the cylindrical passage forming part, it is possible to suppress an undercut of the diameter enlarged portion or the holding part at the time of injection molding that disables mold release of the cylindrical passage forming part.

In the check valve for fuel tank in accordance with the above-described aspect, the holding part may be formed separately from the cylindrical joint and the cylindrical passage forming part. In the check valve for fuel tank of this aspect, the holding part is formed separately from the cylindrical joint and the cylindrical passage forming part. Thus, as compared with the configuration in which the diameter enlarged portion and the holding part are formed integrally with the cylindrical passage forming part, it is possible to suppress an undercut of the diameter enlarged portion or the holding part at the time of injection molding that disables mold release of the cylindrical passage forming part.

The present disclosure may be achieved by various aspects other than the check valve for fuel tank. For example, the present disclosure may be achieved by the aspects such as a method of manufacturing a check valve for fuel tank, a fuel supply device with a check valve for fuel tank, and a vehicle with a check valve for fuel tank.

What is claimed is:

1. A check valve for fuel tank, comprising:
 a cylindrical joint that is fixed to a fuel tank to surround a tank opening formed on the fuel tank and is connected to a fuel supply pipe;
 a cylindrical passage forming part that is arranged at least partially in the fuel tank, is connected to the cylindrical joint at one end of the cylindrical passage forming part, and includes an outlet for letting a fuel flow out at the other end of the cylindrical passage forming part; and
 a valve member that opens and closes the outlet; wherein the valve member includes:
  a valve element including a sealing part sealing the outlet and an axis part continuous to the sealing part along an axis line of the cylindrical passage forming part, and formed to be movable along the axis line;
  a spring bearing part arranged at an end of the axis part being an end on an opposite side of an outlet side of the axis part;

a holding part continuous to at least one of the cylindrical joint and the cylindrical passage forming part and arranged on an outlet side of the spring bearing part to surround and hold at least a part of the axis part; and
a compression coil spring fixed to the holding part and the spring bearing part at both ends in an axis direction of the compression coil spring, an inner diameter of the cylindrical joint is smaller than an inner diameter of an end on an outlet side of the cylindrical passage forming part, an inner side of the cylindrical joint and an inner side of the cylindrical passage forming part are communicated to each other to form a fuel passage, a part corresponding to an end on a cylindrical joint side of the cylindrical passage forming part in the fuel passage comprises a diameter enlarged portion having an inner diameter gradually increasing from a fuel supply pipe side of the fuel passage toward an outlet side of the fuel passage, a cylindrical diameter enlarged member that is formed separately from the cylindrical joint and the cylindrical passage forming part and is arranged along an inner side surface of the cylindrical passage forming part, an inner diameter of the diameter enlarged member gradually increases from a fuel supply pipe side of the diameter enlarged member toward an outlet side of the diameter enlarged member, and the diameter enlarged member forms the diameter enlarged portion.

* * * * *